UNITED STATES PATENT OFFICE.

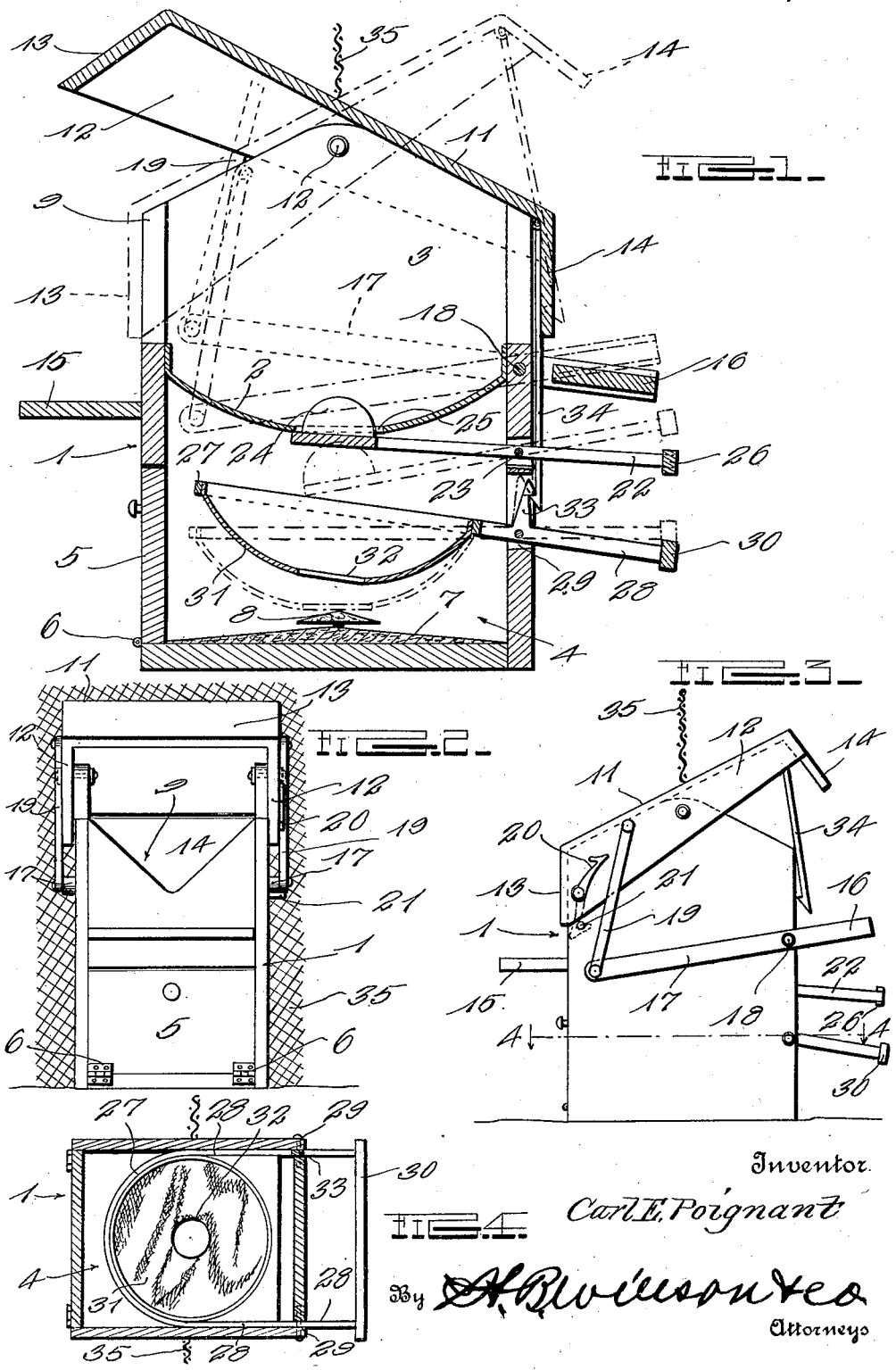

CARL EMIL POIGNANT, OF MATSQUI, BRITISH COLUMBIA, CANADA, ASSIGNOR OF ONE-HALF TO CARL GUST POIGNANT, OF MATSQUI, CANADA.

POULTRY-NEST.

1,399,872.  Specification of Letters Patent.  Patented Dec. 13, 1921.

Application filed October 20, 1919. Serial No. 332,074.

*To all whom it may concern:*

Be it known that I, CARL EMIL POIGNANT, a citizen of Canada, residing at Matsqui, in the Province of British Columbia, Canada, have invented certain new and useful Improvements in Poultry-Nests, of which the following is a specification.

This invention relates to an improved poultry nest and one object of the invention is to provide a nest so constructed that a hen may enter the same through an entrance and when an egg has been laid, the entrance close and an exit open, thus preventing the hen from leaving the nest by the entrance passage.

Another object of the invention is to so mount the cover which forms the doors for the entrance and exit that it may be releasably held in a position to close the exit and this means moved to release the cover and permit it to swing to a position to close the entrance and open the exit by the weight of an egg dropping upon a trip.

Another object of the invention is to so construct this nest that a nest egg mounted upon a movable support may form a closure for an opening formed in the bottom of the nest thus preventing the trip to be operated except when an egg passes through the opening and falls upon the trip positioned in a compartment beneath the nest.

Another object of the invention is to so construct this nest that the cover may be returned to the original position to open the entrance and close the exit, the cover being moved though the medium of arms supporting a platform stepped upon by the hen when leaving the nest.

Another object of the invention is to so construct this nest that the cover will only be swung to open the exit and close the entrance by the action of means operated by the egg which has been laid and thereby permitting the device to serve as means for separating the laying hens from the hens which are not laying.

Another object of the invention is to so construct this nest that there will be no danger of the eggs being broken.

This invention is illustrated in the accompaying drawings, wherein:

Figure 1 is a vertical sectional view through the improved nest and showing the cover in a position to close the exit and open the entrance, the reverse position of the structure being indicated by dotted lines.

Fig. 2 is a view showing the improved nest in front elevation.

Fig. 3 is a view showing the nest in side elevation.

Fig. 4 is a horizontal sectional view taken along the line 4—4 of Fig. 3.

This improved nest is provided with a housing 1 having a partition 2 provided therein and dividing the housing into an upper compartment 3 and a lower compartment 4 which may be termed the egg compartment. A door 5 is hingedly mounted as shown at 6 so that by swinging the door 5 to an open position access may be had to the interior of the egg compartment and thus the eggs removed. It should be further noted that the bottom of the housing is provided with a sloping flooring 7 and that a guide 8 is provided at the center of the flooring so that the eggs will be prevented from being broken as will be hereinafter brought out.

The upper compartment 3 is open at its upper end and has its forward and rear walls cut away to provide an entrance 9 and an exit 10 by means of which the hens will enter and leave the nest. A cover 11 is pivotally connected with the side walls of the housing and is provided with side walls 12 through which the pivot fasteners 12' pass and end walls 13 and 14 which are adapted to extend across and close the entrance and the exit. It will thus be seen that when the cover is in the position shown in full lines in Fig. 1, the end wall 14 of the cover will close the exit and the entrance will be open, whereas if the cover is in the position indicated by dotted lines in this figure, the end wall 13 will close the entrance and the exit will be open. A platform 15 is provided so that the hens can conveniently enter the nest and a platform 16 is positioned outside the exit so that the hens may step upon this platform 16 when leaving the nest. This platform 16 is carried by side arms 17 which are pivotally connected with the housing as shown at 18 and these side arms extend forwardly and have their forward ends loosely connected with the links 19 which links extend upwardly and are pivotally connected with the side walls of the cover. It will thus be seen that when the hen steps upon the platform 16, the arms will be swung upon the pivots 18 and the links 19 moved upwardly thus moving the cover from the position shown in Fig. 3 and indicated by dotted lines in Fig. 1 to that shown in full lines in Fig. 1. Of course, if the latching hooks 20 have been swung downwardly to the dotted line position of Fig. 3 to engage the pins 21, the cover will be prevented from moving upwardly and the hen may leave the nest without the cover being moved to a position permitting another hen to pass in through the entrance.

An arm or bar 22 is pivotally mounted in an opening formed in the rear wall of the housing as shown at 23, and at its inner forward end carries a nest egg 24 which will extend into and form a closure for the egg passage 25 formed in the partition 2. A counter-balance weight 26 is provided at the outer end of this bar 22 in order to normally retain the bar in the position shown with the nest egg closing the opening 25. It will thus be seen that the nest egg not only serves as a nest egg but further serves as means for closing the opening 25 and preventing the hen's foot from passing through this opening and actuating a trip mounted beneath the bar 25. The trip is provided with a yoke or frame 27 having side arms 28 which extend rearwardly and are passed through and pivotally mounted in openings formed in the rear wall as shown at 29 and these arms have their outer ends connected by a cross bar 30 which serves as a counter-balance to normally retain the frame in the position shown in Fig. 1. This frame carries a sack or basket 31 preferably formed of fabric or some other similar material, so that there will be no danger of the eggs breaking and this basket or sack is provided with an opening 32 through which the eggs may pass. From an inspection of Fig. 1, it will be readily seen that when the trip is moved to the dotted line position by the weight of the eggs, the opening 32 will be positioned close to the guide or bumper 8 and the egg will pass through the opening and down upon this guide. The basket or trip will then be returned to the normal position by the weight of the cross bar 30 and the egg will roll down upon the cabin floor 7 to a point adjacent one wall of the egg compartment. A latching hook 33 is carried by the frame 27 adjacent the fulcrum thereof and this latching hook is adapted to engage a latching hook 34 carried by the cover. It will thus be seen that the trip will prevent the cover from moving to the dotted line position until an egg has dropped upon the trip and swung the trip out of engagement with the latching hook 34. As soon as this trip has moved to the released position, the cover which is mounted to swing to the dotted line position when released will swing to this position and thus close the entrance and leave the exit open. The hen can therefore only leave the nest by means of the exit and in doing so will step upon the platform 16 thus causing the arms 17 to swing upon their pivots 18 and move the cover through the medium of the links 19. The cover will thus be returned to the full line position of Fig. 1 and the hook 34 will again engage the hook 33 thus preventing the cover from returning to the dotted line position when the hen leaves the platform 16. It will thus be seen that if the nest is mounted with one portion positioned to one side of the wire fence 35 and the second portion extending upon the opposite side of the fence, the hens which enter the nest and leave by the exit will be separated from those which have not passed through the nest.

When this device is in use the nest is set up in an opening formed in a line fence between two hen-yards and a hen will enter the nest through the entrance 9. If an egg is not laid the cover or roof will remain in the position shown thus closing the exit and the hen must return to the first yard through the entrance. If an egg is laid, the egg will strike the nest egg 24 and cause the arm 22 to swing to the dotted line position thus permitting the egg to drop down into the fabric basket of the trip. The weight of the egg will swing the trip to the dotted line position, thus permitting the egg to pass out through the opening 32 without danger of being broken and the trip will then return to the original position, the arm 22 having already returned to the position to close the opening 25. While the trip is in the dotted line position, the latch 33 will be out of engagement with the latch 34 and the cover will of its own weight swing to the dotted line position to close the entrance and open the exit. The hen can therefore only leave the nest through the exit and will pass into the second hen-yard. In leaving the nest, the hen will step upon the platform 16 and the weight of the hen will cause the cover to be returned to the original position, in which position the hook 34 will again engage the hook 33 and the cover will be retained in this position until a second egg has been laid in the nest. Of course, if it is desired to have the nest serve as a trap-nest, a number of these nests can be set up in the line fence and the second yard divided into a plurality of compartments. The latching hooks 20 will be swung to the dotted line position and when the hen leaves the nest, the hooks will engage the pins 21 thus preventing the weight of the hen from swinging the cover to the open position. Therefore, only one egg can be laid in each nest and the hen laying the eggs will be confined in the compartment of the second yard with which this particular nest communicates. When it is desired to remove the eggs from the nest, it is simply necessary to swing the door 5 to an open position and the eggs can be removed from the bottom of the egg compartment 4.

I claim:—

1. In a poultry nest, the combination of a housing having a lower egg receiving compartment and an upper compartment, a roof structure acting as doors for an inlet and outlet to the upper compartment, a detent for holding one door open and the second door closed, means to release said detent when an egg passes into the lower compartment, and means to restore the doors to their initial positions when a hen leaves the nest.

2. In a poultry nest, the combination with a housing having an entrance and an exit, doors for the entrance and exit pivotally mounted and connected with a pair of pivoted arms, an egg receiving compartment, a detent to hold the exit door shut and the entrance open, means to disengage said detent consisting of a trip operated by an egg in passing from the nest into the egg receiving compartment, means to cause the doors to return to their initial positions, and means to releasably lock the doors in an adjusted position to prevent them from returning to their initial positions.

3. In a poultry nest, the combination of a housing having a hen receiving compartment having an entrance and an exit, and a lower egg receiving compartment, a tiltable cover for the housing acting as doors for the entrance and exit, an exit platform having connection with the cover, a pivoted nest egg, a detent to hold the exit door closed, means operated by an egg to release the detent and permit the cover to swing out of its set position, and means operated by the weight of a hen upon the platform to return the cover to its original position.

4. In a poultry nest, the combination of a lower egg receiving compartment, a pivoted nest egg, a concave-shaped strip having a central opening, a pair of pivoted doors connected with a pair of pivoted arms, a detent to hold one door open and the second door closed, means causing the eggs to release said detent, and means for returning the doors to their initial positions operated by a hen leaving the nest.

5. In a poultry nest, the combination of a housing having an upper compartment and a lower egg receiving compartment, the housing having an entrance and an exit for the upper compartment, an adjustable counterbalance trip, a counter-balance nest egg positioned for engagement by an egg passing from the upper compartment into the lower compartment, a tiltable cover for the housing constituting doors for the entrance and exit, means operated by an egg to release the door for swinging out of its set position, and means actuated by the weight of a hen to return the cover to its initial position.

6. A device of the class described comprising a housing provided with an entrance and an exit, a nest immovably supported in said housing, doors for said entrance and said exit, means independent of said nest for holding the entrance door open and the exit door closed and operable by an egg laid in said nest to reverse the position of said doors, and means independent of said nest and positioned externally of said housing and actuated by the weight of the hen after leaving said housing for restoring said doors to the initial position.

7. A device of the class described comprising a housing provided with an entrance and an exit, a nest immovably supported in said housing, doors for alternately closing said entrance and said exit and being biased to the position where said entrance is closed and said exit is open, means independent of said nest for holding said doors in the reverse position and operable by an egg laid in said nest to permit said doors to assume the first mentioned position, and means independent of said nest and positioned externally of said housing and actuated by the weight of the hen after leaving said housing for restoring said doors to said reverse position.

8. A device of the class described comprising a housing provided with an entrance and an exit, a nest immovably supported in said housing and having an egg passage in its bottom, a door structure including a pair of doors for alternatively closing said entrance and said exit and being biased to the position where said entrance is closed and said exit is open, an egg receiving tray movably mounted in said housing beneath the passage of said nest, said tray being biased to one position and movable to another position by an egg passing therethrough, coacting elements carried by said door structure and by said tray and engaged when said tray is in its biased position and said door structure is in the position reverse to the above specified, said elements becoming disengaged upon movement of said tray to its other position and thereby permitting said door structure to move to its biased position, a platform movably mounted externally of said housing and having connection with said door structure for restoring said door structure to its initial position when the platform is moved downwardly by the hen stepping upon the platform after leaving said housing.

In testimony whereof I have hereunto set my hand in presence of two subscribing witnesses.

Matsqui, B. C., October 6th, 1919.

CARL EMIL POIGNANT.

Witnesses:
 LOTH SWARD,
 HEDWIG POIGNANT.